United States Patent [19]
Bernier et al.

[11] Patent Number: 5,934,115
[45] Date of Patent: Aug. 10, 1999

[54] CIRCUIT BREAKER PANELBOARD LOCK ASSEMBLY

[75] Inventors: Richard E. Bernier, Mebane; Kevin F. Nolan, Hillsborough; Michael Nanney, Mooresville, all of N.C.

[73] Assignee: General Electric Company, Schenectady, N.Y.

[21] Appl. No.: 08/863,656

[22] Filed: May 27, 1997

[51] Int. Cl.⁶ .................................................. E05C 1/10
[52] U.S. Cl. ............................. 70/208; 70/464; 109/61; 292/153; 292/175; 292/DIG. 38; 292/DIG. 61; 292/DIG. 73
[58] Field of Search ...................... 292/175, DIG. 38, 292/DIG. 61, DIG. 30, DIG. 31, DIG. 41, DIG. 54, 153, DIG. 55, DIG. 56, DIG. 57, DIG. 73; 109/61–63; 70/208, 463, 464

[56] References Cited

U.S. PATENT DOCUMENTS

| | | | |
|---|---|---|---|
| 2,221,110 | 11/1940 | Ross | 292/175 X |
| 4,121,863 | 10/1978 | Lawrence | 292/175 |
| 4,195,867 | 4/1980 | Baillie | 292/175 X |
| 4,343,162 | 8/1982 | Giacometti | 292/175 X |
| 4,408,914 | 10/1983 | Ciesiel et al. | 292/DIG. 38 X |
| 4,676,081 | 6/1987 | Craig | 70/169 |
| 4,790,579 | 12/1988 | Maxwell et al. | 292/175 |
| 4,837,975 | 6/1989 | Simpson | 292/175 X |
| 4,995,649 | 2/1991 | Magnusson | 292/175 |
| 5,121,951 | 6/1992 | Harbom et al. | 292/175 |
| 5,126,918 | 6/1992 | Morby et al. | 361/358 |
| 5,158,329 | 10/1992 | Schlack | 292/DIG. 38 X |
| 5,193,707 | 3/1993 | Mizumura | 292/175 X |
| 5,618,067 | 4/1997 | Carlson et al. | 292/175 |

FOREIGN PATENT DOCUMENTS

| | | | |
|---|---|---|---|
| 2226199 | 12/1973 | Germany | 292/DIG. 38 |
| 2242475 | 10/1991 | United Kingdom | 292/175 |

*Primary Examiner*—Lloyd A. Gall
*Attorney, Agent, or Firm*—Carl B. Horton; Edmund P. Anderson

[57] ABSTRACT

A lock assembly is formed from a two-piece plastic unit that is held together and to the compartment door by a planar lanced metal spring. The latch projection is ramped relative to the latch retainer slot within the compartment door to cause the latch piece to become jammed within the retainer slot in the event the door is subjected to severe internally-generated gas pressures.

9 Claims, 5 Drawing Sheets

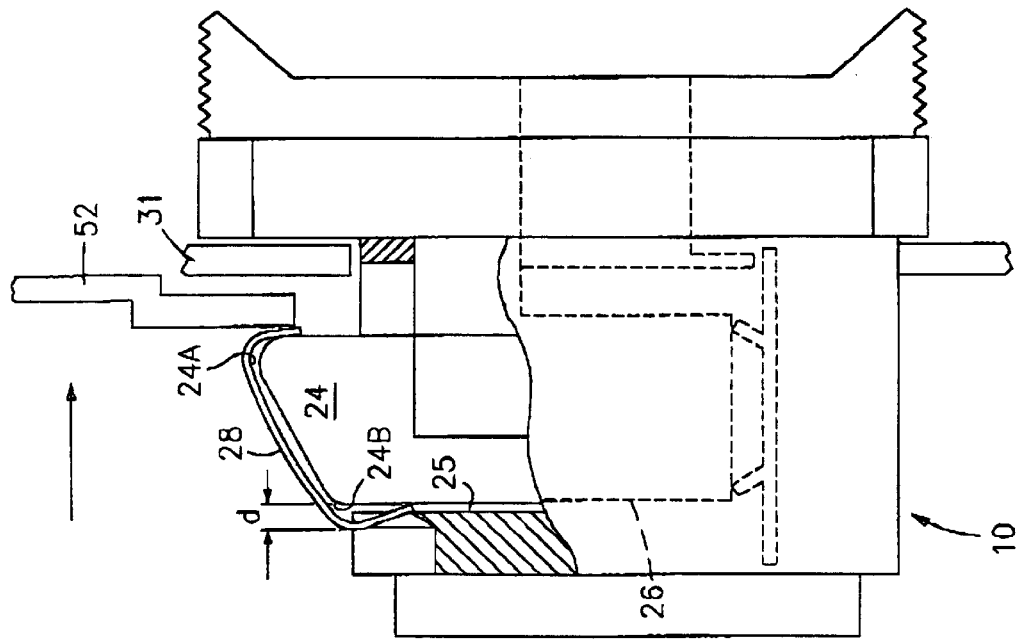
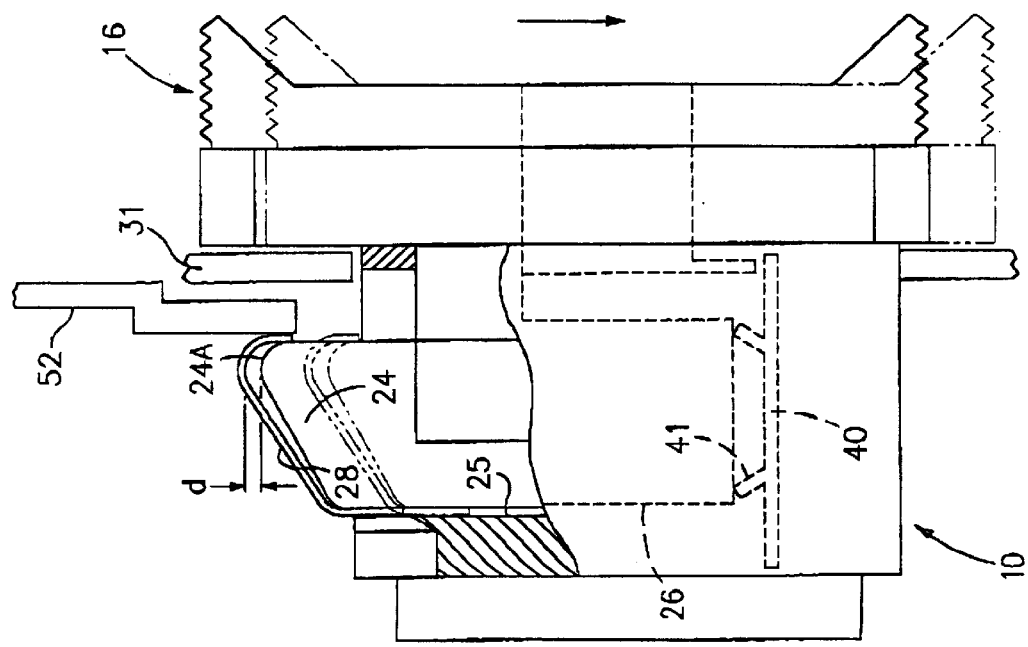

CIRCUIT BREAKER PANELBOARD LOCK ASSEMBLY

BACKGROUND OF THE INVENTION

Circuit breaker enclosures such as described within U.S. Pat. No. 5,126,918 entitled "Electric Power Distribution Panelboard-Switchboard Assembly" often provide means for venting the enclosures in the event of a serious overcurrent condition within any of the enclosed circuit protection equipment.

Access to the circuit protection equipment within the enclosures is prevented by means of a panel lock to insure that the electrical equipment settings are not changed by unauthorized personnel. One such panel lock is described within U.S. Pat. No. 4,676,081 entitled "Snap-In Semi-Flush Mounted Panel Lock".

The panel locks are generally fabricated from a thermoplastic compound and include plastic means integrally-formed on the lock assembly to retain the locks within the enclosures. The bolts used with such locks are steel fabricated to insure that the locks do not change dimensions over long periods of extended usage.

Upon severe overcurrent conditions whereby several atmospheres of gas pressure are generated within the arc chambers that are incorporated within the circuit protection equipment, gas vents per se may not be sufficient to vent the gas pressure such that the enclosure doors are blown open causing damage to the doors, locks and possible damage to nearby personnel.

One purpose of the invention is to provide a panel lock assembly that is resistant to such high pressures and thereby prevent the doors from becoming blown open without adding substantial cost to the locks or the doors.

SUMMARY OF THE INVENTION

A lock assembly is formed from a two-piece plastic assembly that is held together and to the compartment door by means of a planar lanced metal spring. The plastic latch projection is captured within a steel clip to protect the latch projection from damage due to wear. The latch projection is ramped relative to the latch retainer slot within the compartment door to cause the latch piece to become jammed within the retainer slot in the event the door is subjected to severe internally-generated gas pressures.

BRIEF DESCRIPTION OF THE DRAWINGS

FIG. 5A is a side view of the lock assembly of FIG. 1 depicting the position of the latch under quiescent circuit conditions;

FIG. 5B is a side view of the lock assembly of FIG. 1 depicting the position of the latch under intense overcurrent circuit conditions.

DESCRIPTION OF THE PREFERRED EMBODIMENT

Figure 1:
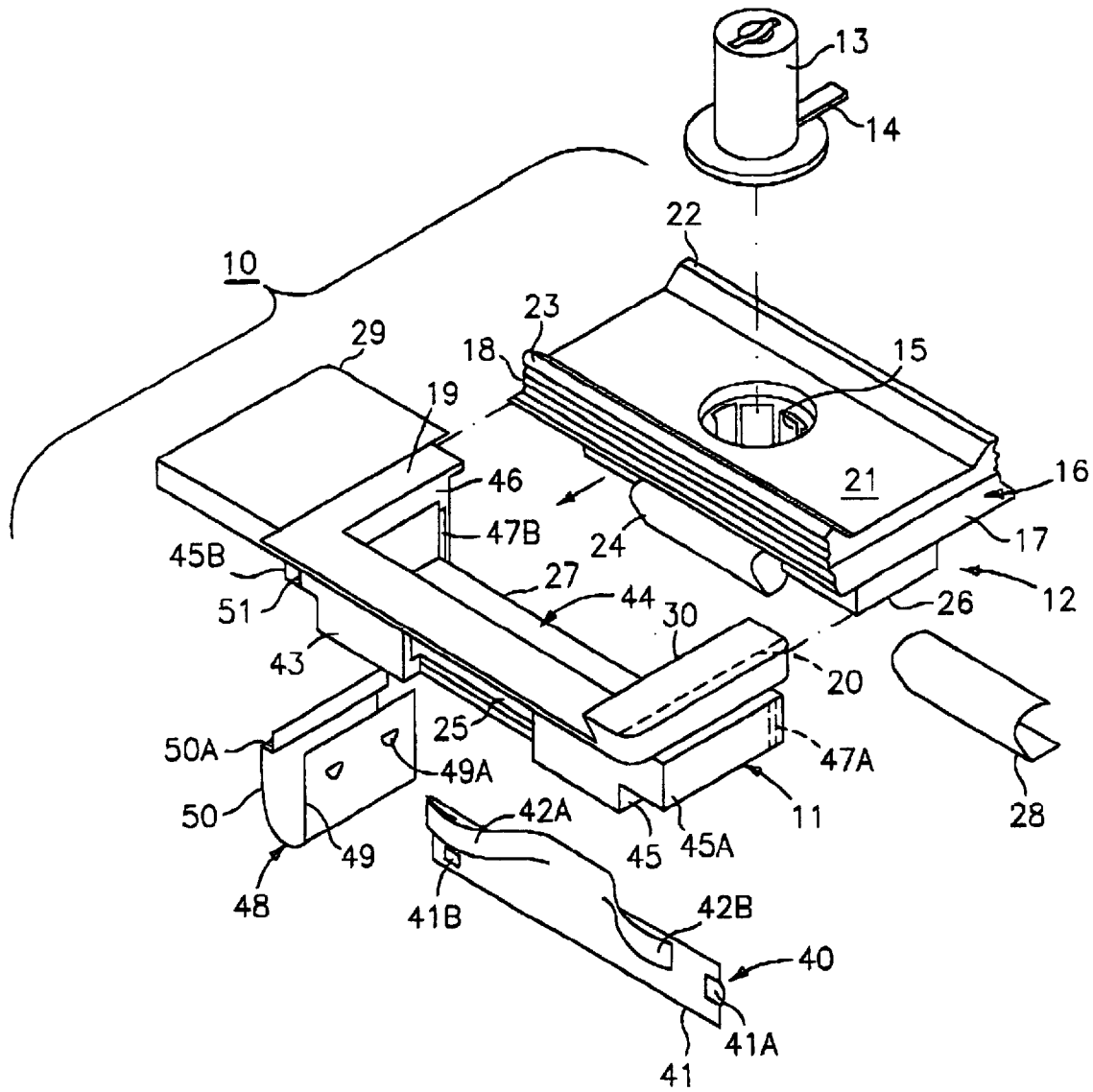
FIG. 1 is a top perspective view of the lock according to the Invention, prior to assembly.
Figure 2:
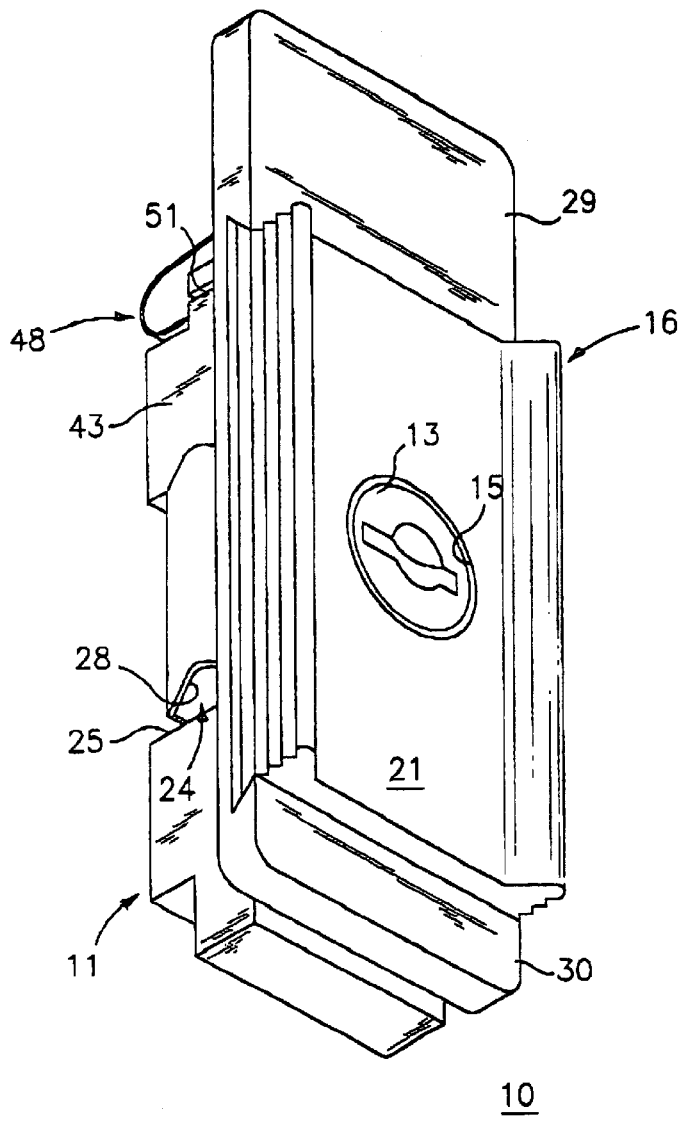
FIG. 2 is an enlarged front perspective view of the lock of FIG. 1 after assembly.
Figure 3:
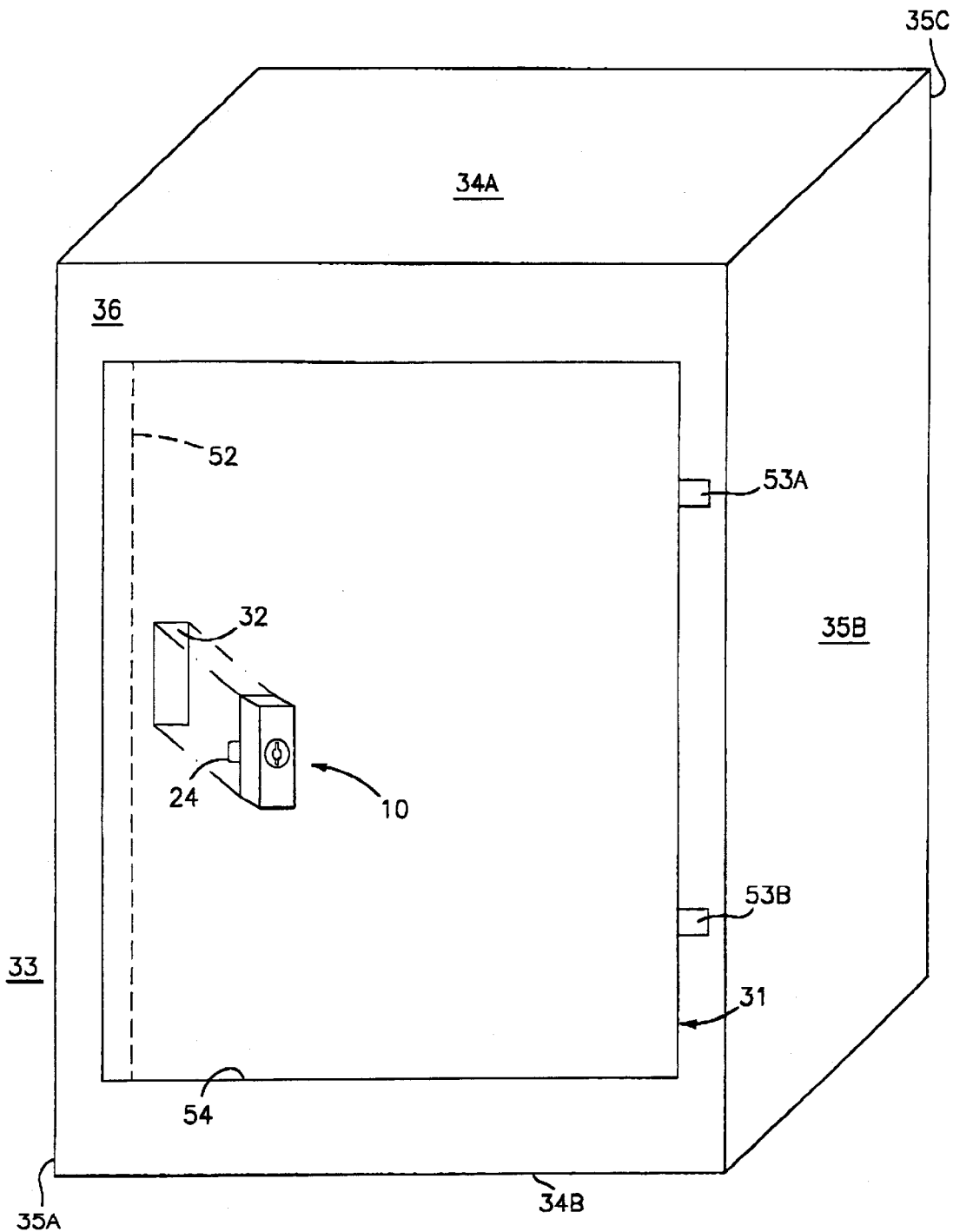
FIG. 3 is front perspective view of the lock of FIG. 1 in isometric projection with respect to a Panelboard enclosure.

The lock assembly 10 is shown in FIGS. 1 and 2 to include a metal escutcheon 11 and an integrally-molded thermoplastic latch 12 prior to assembly. The latch plate 16 defines side extensions 17, 18 that are received within the rails 19, 20 formed within the escutcheon. The sidewalls 22, 23 upstanding from the top wall 21 provide means for an operator to move the latch plate forward and back along the escutcheon whereby the latch projection 24 moves in and out of the elongated slot 25 formed within the escutcheon 11 into interference with the plate 52 extending within a Panelboard enclosure 33 (FIG. 3). The cylindrical opening 15 formed through the latch plate 16 captures the cylindrical lock barrel 13 that includes a lock tab 14 extending from the bottom thereof which interferes with the return of the latch plate and the latch projection 24 from the slot 25 and the Panelboard plate described earlier, in the manner to be discussed below in greater detail. Prior to the assembly of the latch to the escutcheon, the elongated C-shaped latch clip 28 is positioned over the latch projection 24 to allow a metal-to-metal interface between the slot 25 and the aforementioned panelboard plate and thereby prevent distortion or damage to the latch projection over long periods of extended usage. When the latch plate 16 is positioned within the recess 44 defined within the escutcheon 11 by means of the escutcheon bottom wall 27, backwall 43 and sidewalls 45, 46, the side extensions 17, 18 on the latch plate are received within the rails 19, 20 as described earlier and the bottom wall 26 abuts against and is supported on the escutcheon bottom wall 27 formed on the escutcheon. The escutcheon top and bottom extensions 29, 30, are received on the front of the aperture 32 formed within the panelboard door 31 (FIG. 3) while the escutcheon backwall 43 and sidewalls 45A, 45B extend within the interior of the panelboard enclosure. With the latch plate 16 positioned within the recess 44, the latch spring 40 is inserted within the slots 47A, 47B formed within the escutcheon sidewalls and is retained therein by means of the detents 41A, 41B at opposing ends of the latch spring. The wing extensions 42A, 42B lanced within the latch spring provide bias to the latch 12 in the direction of the elongated slot 25 within the escutcheon to position the latch projection 24 within the slot 25. The U-shaped door spring 48 is next positioned within the escutcheon by placing the planar sidewall 49 within the slot 51 formed in the sidewall 45B such that the detents 49A retain the door spring therein. The opposing sidewall 50 is used to retain the lock assembly 10 within the aperture 32 (FIG. 3) by means of the striations 50A formed at the end of the sidewall in the manner to be described below with reference to FIG. 4.

The completely assembled lock 10 is best seen by now referring to FIGS. 2 and 3 wherein the latch plate 16 is positioned such that the top wall 21 of the latch plate 16 extends above the escutcheon top and bottom extensions 29, 30 and the lock barrel 13 within the cylindrical opening 15 is accessible from the front of the top wall. The latch projection 24 containing the latch clip 28 extends through the elongated slot 25 formed in the backwall 43 of the escutcheon as viewed in FIG. 2.

The lock 10 is next positioned within the rectangular aperture 32 formed in the door 31 of the panelboard enclosure 33 in the manner to be described below with reference to FIG. 4. Referring to FIG. 3, it is seen that the panelboard 36 having the door opening 54 is depicted as a simplified model of that described within the aforementioned U.S. Pat.

No. 5,126,918 and consists further of top and bottom walls 34A, 34B joined by opposing sidewalls 35A, 35B and a backwall 35C. When positioned within the aperture 32, the latch projection 24 interacts with the plate 52 extending within the panelboard enclosure to prevent the door from rotating to an open position about the door hinges 53A, 53B.

Figure 4:
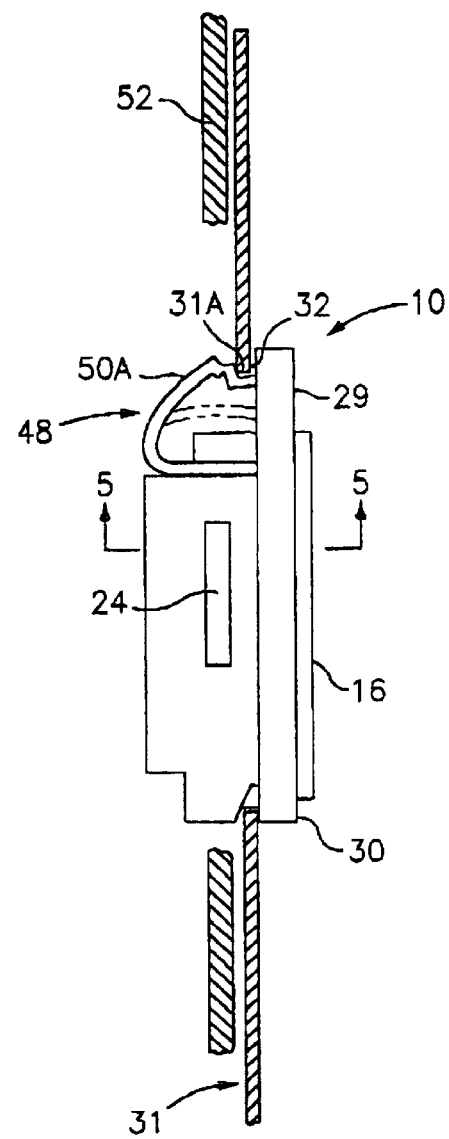
FIG. 4 is an enlarged side view of the lock of FIG. 1 within the door of the Panelboard enclosure FIG. 3.

As shown in FIG. 4, when the lock 10 is pressed within the aperture 32 in the door 31, the door spring 48 moves from the compressed condition indicated in phantom to the extended condition depicted in solid lines with the striated end 50A positioned behind the door as indicated at 31A. The escutcheon top and bottom extensions 29, 30 abut against the outside of the door with the latch plate 16 accessible from the exterior thereof. The latch projection 24 is positioned on the opposite side of the door in alignment with the panelboard enclosure plate 52, which is broken away for purposes of clarity.

The operation of the lock 10 to hold the door 31 in a closed position is best seen by now referring to FIGS. 5A and 5B which depict the lock in the plane 5—5 of FIG. 4. The wing extensions 42A, 42B on the latch spring 40 bias the bottom wall 26 and the latch projection 24 in the home position depicted in solid lines so that the latch projection sits behind the plate 52 to hold the door 31 in its closed position. To open the door, the latch plate 16 is moved in the indicated direction which moves the latch projection 24 and bottom wall 26 against the wing extensions 42A, 42B away from behind the plate 52 as indicated in phantom. The bottom wall 26 and latch projection 24 slide along the elongated slot 25 to allow the latch projection to move away from the panelboard enclosure plate 52. It is noted that the latch clip 28 oversizes the edge of the latch projection 24 a predetermined distance d as indicated at 24A under normal circuit conditions within the electrical equipment (not shown) that are contained within the panelboard enclosure 33 (FIG. 3). Upon occurrence of an intense overcurrent condition, gaseous vapors are produced by the electric arcs generated within the electrical equipment, such that a high pressure force is exerted on the door 31 as indicated in FIG. 5B. In the event the panelboard enclosure is unable to quickly vent and decrease the pressure generated therein, the pressure could ordinarily blow open the door and cause damage to both personnel and associated electrical equipment in the vicinity of the panelboard enclosure. To prevent the door from becoming blown open, the latch clip 28 operates in the following manner.

The pressure in the direction indicated in FIG. 5B forces the latch clip 28 into close contact with both the enclosure plate 52 and the latch projection 24 at one end of the latch clip, as indicated at 24A, to displace the opposite end of the latch clip away from the latch projection by the same predetermined distance d as indicated at 24B. In this position, the bottom wall 26 and latch projection 24 are prevented from passing through the elongated slot 25 and hence, the door 31 is jammed into the closed position to thereby prevent damage to associated electrical equipment and personnel in the vicinity of the panelboard enclosure during such intense overcurrent conditions.

The automatic sealing of the panelboard door in the manner described is an important feature of the invention.

Figure 5D:
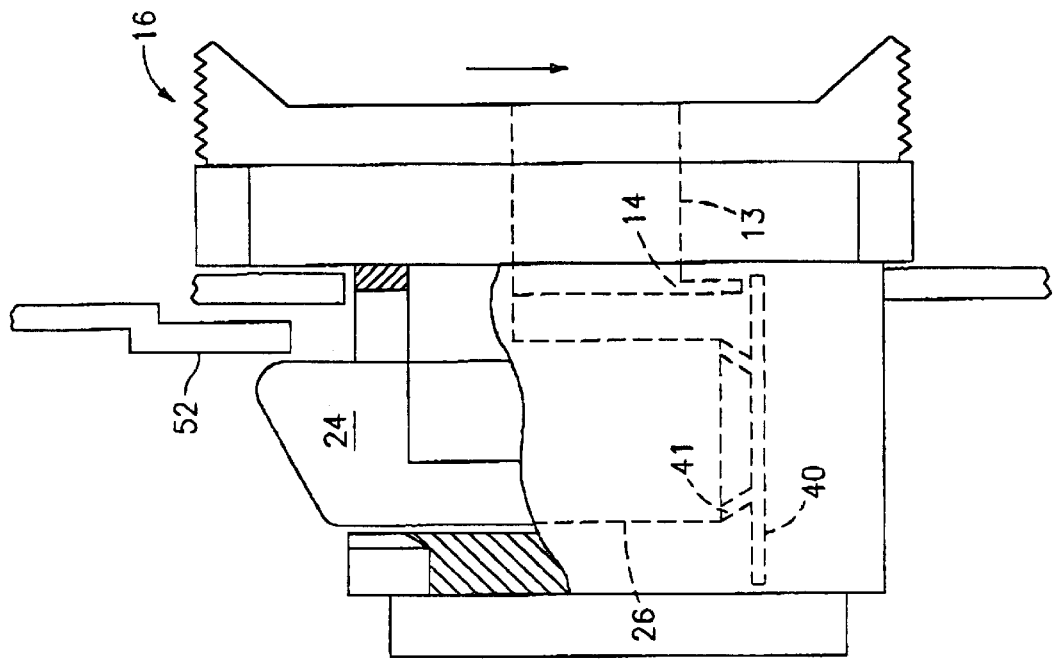
FIG. 5D is a side view of the lock assembly of FIG. 1 depicting the position of the lock tab under a "locked" condition.
Figure 5C:
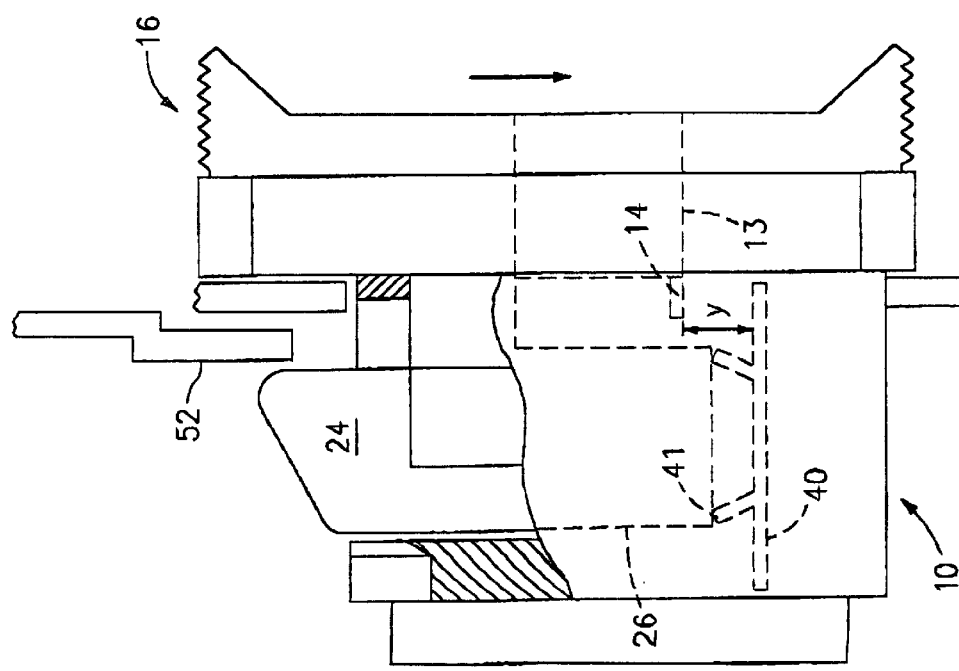
FIG. 5C is a side view of the lock assembly of FIG. 1 depicting the position of the lock tab under an "unlocked" condition.

The operation of the lock barrel 13 to place the lock 10 in "locked" and "unlocked" conditions is best seen by now referring to FIGS. 5C and 5D. In FIG. 5C, the lock barrel 13 is arranged with the lock tab 14 away from the latch spring 40 thereby defining a clearance distance y that allows the bottom wall 26 and latch projection 24 to move back against the urgence of the wing extensions 42A, 42B on the latch spring 40 away from the panelboard plate 52 when the latch plate 16 is moved in the indicated direction. When the lock barrel 13 is rotated such that the lock tab 14 is in contact with the latch spring 40, movement of the latch plate 16 is thereby prevented such that the bottom wall 26 and latch projection 24 are unable to move away from the panelboard plate 52.

A lock for use with Panelboard and other electrical enclosures has herein been described.

The simplified use of molded plastic materials with metal clips to prevent wear and tear under long term usage. The latch projection on the lock is arranged for preventing the enclosure door from becoming blown open under intense gas pressure.

We claim:

1. A lock assembly comprising:

an escutcheon comprising a top wall joined by a pair of opposing side walls and a bottom wall, said escutcheon further including a recess defined between said side walls and said bottom wall;

a latch comprising a rectangle having a central orifice, a lock cylinder received within said central orifice, said latch further including a pair of side extensions, one on each side of said rectangle, said extensions being received within rails formed on said escutcheon side walls for guiding said latch in and out of said recess;

a latch projection formed on a front surface of said latch;

a latch projection slot located in said escutcheon bottom wall, wherein said latch projection is adapted to be moved in and out of said latch projection slot in response to forward and reverse movement of said latch;

a spring clip positioned over said latch projection for providing wear resistance to said latch projection;

a predetermined clearance gap between said spring clip and said latch projection. wherein said predetermined clearance gap is determined so as to prevent said spring clip and said latch projection from being moved out of the latch projection slot upon the provision of gas pressure to said escutcheon and said latch;

a latch spring means on said escutcheon for biasing said latch in a first direction within said escutcheon recess and retaining said latch within said escutcheon recess; and door spring means on said escutcheon for retaining said escutcheon and said latch within a door.

2. The lock assembly of claim 1 wherein said rectangle further defines a top surface having upstanding edges formed thereon for facilitating digital access to said latch by an operator to provide said forward and reverse movement.

3. The lock assembly of claim 1 wherein said escutcheon and said latch comprise plastic and said spring clip comprises metal.

4. The lock assembly of claim 1 wherein said escutcheon side walls include latch spring retaining slots for receiving ends of said latch spring means to retain said latch spring means on said escutcheon.

5. The lock assembly of claim 1 wherein said latch spring means comprises an elongated rectangle including a pair of tabs lanced within said rectangle and upstanding therefrom, said lanced tabs providing bias force against a rear surface of said latch.

6. The lock assembly of claim 1 wherein said door spring means defines a U-shaped configuration comprising a pair of first and second spring side arms joined together at one of their ends.

7. The lock assembly of claim 6 wherein one of said escutcheon side walls includes a slot arranged for receiving an opposite end of one of said first and second door spring side arms.

8. The lock assembly of claim 7 wherein an opposite end of said second door spring side arm is serrated for enhancing reception within a door aperture.

9. The lock assembly of claim 1 including a lock tab arranged at one end of said lock cylinder for interfering with movement of said latch within said recess.

* * * * *